(12) United States Patent
Furukawa et al.

(10) Patent No.: US 12,012,529 B2
(45) Date of Patent: Jun. 18, 2024

(54) ADHESIVE TAPE AND ARTICLE

(71) Applicant: DIC Corporation, Tokyo (JP)

(72) Inventors: Yoshimi Furukawa, Kitaadachi-gun (JP); Yusuke Takahashi, Kitaadachi-gun (JP); Hiroyuki Nakashima, Kitaadachi-gun (JP); Takeshi Iwasaki, Kitaadachi-gun (JP); Keiji Tsunashima, Takaishi (JP); Sin Sou, Takaishi (JP)

(73) Assignee: DIC CORPORATION, Tokyo (JP)

( * ) Notice: Subject to any disclaimer, the term of this patent is extended or adjusted under 35 U.S.C. 154(b) by 719 days.

(21) Appl. No.: 17/044,626

(22) PCT Filed: Apr. 4, 2019

(86) PCT No.: PCT/JP2019/014935
§ 371 (c)(1),
(2) Date: Oct. 1, 2020

(87) PCT Pub. No.: WO2019/203004
PCT Pub. Date: Oct. 24, 2019

(65) Prior Publication Data
US 2021/0071050 A1    Mar. 11, 2021

(30) Foreign Application Priority Data
Apr. 18, 2018 (JP) ................................ 2018-079888

(51) Int. Cl.
*C09J 133/06* (2006.01)

(52) U.S. Cl.
CPC ....... *C09J 133/064* (2013.01); *C09J 133/066* (2013.01); *C09J 2301/30* (2020.08); *C09J 2301/414* (2020.08); *C09J 2433/00* (2013.01)

(58) Field of Classification Search
CPC ................ C09J 133/064; C09J 133/066; C09J 2301/30; C09J 2301/414; C09J 2433/00; C09J 133/10; C09J 7/38
See application file for complete search history.

(56) References Cited

FOREIGN PATENT DOCUMENTS

| | | |
|---|---|---|
| EP | 2 412 773 B1 | 6/2016 |
| JP | 2016-519187 A | 6/2016 |
| JP | 2017-8327 A | 1/2017 |
| JP | 2017-57303 A | 3/2017 |
| JP | 6296184 B1 | 3/2018 |
| WO | 2010/110135 A1 | 9/2010 |
| WO | 2013/042648 A1 | 3/2013 |
| WO | 2014/002203 A1 | 1/2014 |
| WO | 2016/063784 A1 | 4/2016 |

OTHER PUBLICATIONS

International Search Report dated Jul. 2, 2019, issued in counterpart International Application No. PCT/JP2019/014935 (2 pages).
Notice of Reasons for Refusal dated Apr. 6, 2020, issued in counterpart Japanese Patent Application No. 2020-500666, w/English translation (6 pages).

*Primary Examiner* — Kevin R Kruer
(74) *Attorney, Agent, or Firm* — WHDA, LLP

(57) ABSTRACT

A problem to be solved by the present invention is to provide an adhesive tape capable of maintaining excellent adhesive strength for a long time even when sweat, sebum, an alcohol, or the like adheres thereto. The present invention relates to an adhesive tape having an adhesive layer containing an acrylic adhesive, the acrylic adhesive including an acrylic copolymer, in which the acrylic copolymer contains, as constituent components, (A) 5 to 20% by mass of a carboxyl group-containing monomer, (B) 0.01 to 1% by mass of a hydroxyl group-containing monomer, and (C) one or two or more selected from the group consisting of other alkyl (meth)acrylate monomers and alicyclic monomers, in which the average number of carbon atoms of saturated hydrocarbon groups included in the monomers (C) is 4 or less.

5 Claims, No Drawings

ADHESIVE TAPE AND ARTICLE

TECHNICAL FIELD

The present invention relates to an adhesive tape which can be used in the scenes of manufacturing various products, such as electronic devices.

BACKGROUND ART

Adhesive tapes are widely used in the scenes of manufacturing various products, such as electronic devices and automobiles.

The adhesive tapes are usually required to be capable of maintaining excellent adhesive strength for a long time without being affected by water, heat, or the like. Particularly, adhesive tapes which are used in the scene of manufacturing portable electronic devices or in the scene of fixing automobile interior members, where there is an increased chance of touching by persons, are required to be capable of maintaining excellent adhesive strength, for example, even when sweat or sebum adheres thereto, i.e., excellent chemical resistance.

As the adhesive tape capable of maintaining excellent adhesive strength without being affected by sweat or the like, for example, there is a known adhesive tape obtained by using an adhesive composition containing an acrylic copolymer having a hydroxy group and a carboxyl group and a crosslinking agent, the acrylic copolymer containing, as constituent components, 50 to 90% by mass of a (meth) acrylic acid alkyl ester having an alkyl group with 4 to 12 carbon atoms, 3 to 20% by mass of a carboxyl group-containing monomer, 3 to 20% by mass of a hydroxyl group-containing monomer, and 3 to 15% by mass of a (meth)acrylic acid alkyl ester having an alkyl group with 1 to 3 carbon atoms, and having a weight average molecular weight of 700,000 to 2,000,000 and a theoretical Tg of −40° C. or lower (e.g., refer to PTL 1).

However, on the surfaces of portable electronic devices and automobile interiors, there are frequent chances for contact with various substances, such as sweat, sebum, and alcohols. Therefore, when such contact is repeated many times, the above-described adhesive tape may be insufficient, resulting in a decrease in adhesive strength over time in some cases.

CITATION LIST

Patent Literature

PTL 1: International Publication Pamphlet No. 2014/002203

SUMMARY OF INVENTION

Technical Problem

A problem to be solved by the present invention is to provide an adhesive tape capable of maintaining excellent adhesive strength for a long time even when sweat, sebum, an alcohol, or the like adheres thereto.

Solution to Problem

The present inventors have found that the problem described above can be solved by an adhesive tape obtained by using an acrylic adhesive containing an acrylic copolymer including a combination of a specific amount of a carboxyl group-containing monomer, a specific amount of a hydroxyl group-containing monomer, and one or two or more selected from the group consisting of other alkyl (meth)acrylate monomers and/or alicyclic monomers having saturated hydrocarbon groups with an average number of carbon atoms of 4 or less.

That is, the present invention relates to an adhesive tape having an adhesive layer containing an acrylic adhesive including an acrylic copolymer, in which the acrylic copolymer contains, as constituent components, (A) 5 to 20% by mass of a carboxyl group-containing monomer, (B) 0.01 to 1% by mass of a hydroxyl group-containing monomer, and (C) one or two or more selected from the group consisting of other alkyl (meth)acrylate monomers and alicyclic monomers, in which the average number of carbon atoms of saturated hydrocarbon groups included in the monomers (C) is 4 or less.

Advantageous Effects of Invention

An adhesive tape according to the present invention has good initial adhesive strength, is unlikely to be swollen, for example, even when sweat, sebum, an alcohol, or the like adheres thereto, and can maintain excellent adhesive strength for a long time.

DESCRIPTION OF EMBODIMENTS

In an adhesive tape according to the present invention, an adhesive layer contains an acrylic adhesive including an acrylic copolymer, in which the acrylic copolymer contains, as constituent components, (A) 5 to 20% by mass of a carboxyl group-containing monomer, (B) 0.01 to 1% by mass of a hydroxyl group-containing monomer, and (C) one or two or more selected from the group consisting of other alkyl (meth)acrylate monomers and alicyclic monomers, in which the average number of carbon atoms of saturated hydrocarbon groups included in the monomers (C) is 4 or less.

Embodiments of the adhesive tape include, for example, an adhesive tape having the adhesive layer on one side or both sides of a backing directly or with another layer interposed therebetween, and an adhesive tape constituted by the adhesive layer, i.e., a backing-less adhesive tape. The adhesive layer may have a single layer or multilayer structure having the same composition or different compositions.

In the case where the adhesive tape according to the present invention is used to fix two or more adherends, for example, constituting an electronic device or the like, it is preferable to use in the form of a double-sided adhesive tape. Furthermore, in the case where the adhesive tape is used for a label or the like, it is preferable to use in the form of a single-sided adhesive tape having the adhesive layer on one side of a backing directly or with another layer interposed therebetween.

Furthermore, the adhesive tape according to the present invention may be stored in a state where a release film is disposed on a surface of the adhesive layer.

From the viewpoint of better durability to sweat, sebum, alcohols, and the like and contribution to thickness reduction of electronic devices and the like, the adhesive tape according to the present invention to be used preferably has a thickness in a range of 5 μm to 500 μm, more preferably has a thickness in a range of 10 μm to 450 μm, more preferably has a thickness in a range of 15 μm to 400 μm, more preferably has a thickness in a range of 20 μm to 350 μm, more preferably has a thickness in a range of 30 μm to 300 μm, and still more preferably has a thickness in a range of 50 μm to 200 μm.

Furthermore, as the adhesive layer constituting the adhesive tape, from the viewpoint of better durability to sweat, sebum, alcohols, and the like and contribution to thickness reduction of electronic devices and the like, an adhesive layer to be used preferably has a thickness in a range of 5 μm to 200 μm, more preferably has a thickness in a range of 10 μm to 100 μm, and still more preferably has a thickness in a range of 20 μm to 50 μm.

As the adhesive used in the adhesive tape, a (meth)acrylic adhesive including, as a base polymer, an acrylic copolymer which is a copolymer containing (A) a carboxyl group-containing monomer, (B) a hydroxyl group-containing monomer, and (C) one or two or more selected from the group consisting of other alkyl (meth)acrylate monomers and alicyclic monomers and, optionally, into which additives, such as a tackifying resin and a crosslinking agent, are mixed, can be used.

The adhesive used in the adhesive tape according to the present invention includes an acrylic copolymer containing, as constituent components, (C) one or two or more selected from the group consisting of alkyl (meth)acrylate monomers and alicyclic monomers other than (A) and (B) which will be described later. Preferably, the acrylic copolymer contains, as constituent components, one or two or more alkyl (meth)acrylate monomers, and in this case, more preferably, the acrylic copolymer does not contain alicyclic monomers.

The alkyl (meth)acrylate monomer is a (meth)acrylate monomer having an alkyl group at an ester end. The alkyl group of the alkyl (meth)acrylate monomer may be linear or branched. Examples of the alkyl (meth)acrylate monomer include (meth)acrylates having an alkyl group with 1 to 18 carbon atoms, such as methyl (meth)acrylate, ethyl (meth)acrylate, n-butyl (meth)acrylate, isobutyl (meth)acrylate, t-butyl (meth)acrylate, n-hexyl (meth)acrylate, n-octyl (meth)acrylate, isooctyl (meth)acrylate, isononyl (meth)acrylate, 2-ethylhexyl (meth)acrylate, and isostearyl (meth)acrylate. One or two or more of these can be used, but preferably two or more of these are used. Above all, (meth)acrylate monomers having an alkyl group with 1 to 12 carbon atoms are preferably used, and (meth)acrylate monomers with 1 to 10 carbon atoms are more preferably used. In particular, by using at least one (meth)acrylate monomer with 1 to 4 carbon atoms, the average number of carbon atoms of the alkyl groups of the (meth)acrylate monomers can be easily adjusted to 4 or less, which is preferable.

The alicyclic monomer is a monomer having a polymerizable functional group with an unsaturated double bond, such as a (meth)acryloyl group or a vinyl group, and an alicyclic structure-containing group. Here, the "alicyclic structure-containing group" refers to a portion containing at least one alicyclic structure, and hereinafter, may be referred to as an "alicyclic group". Examples of the alicyclic group include a hydrocarbon group and a hydrocarbon oxy group having an alicyclic structure. Examples of the alicyclic monomer include isobornyl (meth)acrylate and cyclohexyl (meth)acrylate.

The average number of carbon atoms of saturated hydrocarbon groups included in the (C) one or two or more selected from the group consisting of alkyl (meth)acrylate monomers and alicyclic monomers is 4 or less, but is more preferably less than 4, more preferably in a range of 1.0 to 3.9, more preferably in a range of 1.5 to 3.8, more preferably in a range of 2.0 to 3.7, and more preferably in a range of 2.5 to 3.6. By setting the average number of carbon atoms in the range described above, the adhesive tape has good initial adhesive strength, is unlikely to be swollen even when sweat, sebum, an alcohol, or the like adheres thereto, and can maintain excellent adhesive strength for a long time.

Note that the average number of carbon atoms of saturated hydrocarbon groups included in the (C) one or two or more selected from the group consisting of alkyl (meth)acrylate monomers and alicyclic monomers can be obtained by adding together each product of the number of carbon atoms in a saturated hydrocarbon group and its molar concentration (mol %), and dividing the total by the total molar concentrations (mol %) of the (C) one or two or more selected from the group consisting of alkyl (meth)acrylate monomers and alicyclic monomers. For example, in the case where an acrylate monomer with a number of carbon atoms A is included in a molar concentration a (mol %) and an acrylate monomer with a number of carbon atoms B is included in a molar concentration b (mol %), the average number of carbon atoms can be obtained by $(A \times a + B \times b)/(a+b)$.

The content of the (C) one or two or more selected from the group consisting of alkyl (meth)acrylate monomers and alicyclic monomers relative to the total amount of acrylic monomers that can be used to produce the acrylic copolymer is preferably 70% by mass or more, more preferably 79 to 98.5% by mass or more, and still more preferably 84 to 97% by mass.

The adhesive used in the adhesive tape according to the present invention includes an acrylic copolymer containing, as a constituent component, (A) a carboxyl group-containing monomer. As the hydroxyl group-containing monomer, for example, a hydroxyl group-containing (meth)acrylate, such as 2-hydroxyethyl (meth)acrylate, 2-hydroxypropyl (meth)acrylate, 4-hydroxybutyl (meth)acrylate, or 6-hydroxyhexyl (meth)acrylate, can be used.

The content of the hydroxyl group-containing monomer relative to the total amount of acrylic monomers that can be used to produce the acrylic copolymer is 0.01 to 1% by mass, but is preferably 0.015 to 0.9% by mass, more preferably 0.02 to 0.7% by mass, more preferably 0.03 to 0.5% by mass, more preferably 0.04 to 0.4% by mass, and more preferably 0.05 to 0.3% by mass. By setting the content in the range described above, better durability to sweat, sebum, alcohols, and the like can be exhibited.

Examples of the carboxyl group-containing monomer that can be used to produce the acrylic copolymer include acrylic acid, methacrylic acid, itaconic acid, maleic acid, (meth)acrylic acid dimers, crotonic acid, and ethylene oxide-modified succinic acid acrylate. In particular, use of acrylic acid as a copolymerization component is preferable from the viewpoint of exhibiting better durability to sweat, sebum, alcohols, and the like.

The adhesive used in the adhesive tape according to the present invention includes an acrylic copolymer containing, as a constituent component, (B) a hydroxyl group-containing monomer. The content of the carboxyl group-containing monomer relative to the total amount of acrylic monomers used to produce the acrylic copolymer is 5 to 20% by mass, but is more preferably 6 to 17% by mass, and more preferably 7 to 15% by mass. By setting the content in the range described above, better durability to sweat, sebum, alcohols, and the like can be exhibited.

The acrylic copolymer can be obtained by copolymerization by a known polymerization method, such as a solution polymerization method, a bulk polymerization method, a suspension polymerization method, or an emulsion polymerization method. From the viewpoint of water resistance of the adhesive, a solution polymerization method or a bulk polymerization method is preferable. As a polymerization initiation method, any of a thermal initiation method using a peroxide-based thermal polymerization initiator, such as benzoyl peroxide or lauroyl peroxide, or an azo-based thermal polymerization initiator, such as azobisisobutylnitrile, an initiation method by ultraviolet irradiation using an acetophenone-based, benzoin ether-based, benzyl ketal-based, acylphosphine oxide-based, benzoin-based, or benzophenone-based photopolymerization initiator, and a method by electron beam irradiation can be selected.

Regarding the molecular weight of the acrylic copolymer, the weight average molecular weight in terms of standard polystyrene measured by gel permeation chromatography (GPC) is preferably 400,000 or more, more preferably 600,000 to 1,100,000, and more preferably 700,000 to 1,000,000. By setting the molecular weight in the range described above, better durability to sweat, sebum, alcohols, and the like can be exhibited.

Here, the value obtained in the measurement of the molecular weight by the GPC method is a standard polystyrene conversion value measured by a GPC device (HLC-8329GPC) manufactured by Tosoh Corporation, and the measurement conditions are as follows.

Sample concentration: 0.5% by mass (THF solution)
Sample injection volume: 100 µL
Eluent: THF
Flow rate: 1.0 mL/min
Measurement temperature: 40° C.
Main column: two TSKgel GMHHR-H(20)
Guard column: TSKgel HXL-H
Detector: differential refractometer
Standard polystyrene molecular weight: 10,000 to 20,000,000 (manufactured by Tosoh Corporation)

As the adhesive that can be used in the present invention, from the viewpoint of obtaining an adhesive sheet having improved adhesive strength, an adhesive containing a tackifying resin can be used.

As the adhesive, from the viewpoint of forming an adhesive layer having improved cohesion, an adhesive containing a crosslinking agent is preferably used.

As the crosslinking agent, for example, an isocyanate-based crosslinking agent, an epoxy-based crosslinking agent, a metal chelate-based crosslinking agent, an aziridine-based crosslinking agent, or the like can be used. In particular, as the crosslinking agent, it is preferable to use a crosslinking agent which is easily mixed and used with the acrylic polymer or a solution thereof produced in advance and allows a crosslinking reaction to proceed rapidly. Specifically, an isocyanate-based crosslinking agent or an epoxy-based crosslinking agent is more preferably used.

As the isocyanate-based crosslinking agent, for example, tolylene diisocyanate, naphthylene-1,5-diisocyanate, hexamethylene diisocyanate, diphenylmethane diisocyanate, xylylene diisocyanate, and trimethylolpropane-modified tolylene diisocyanate, and the like can be used. Preferably, tolylene diisocyanate and trimethylolpropane-modified tolylene diisocyanate are used.

From the viewpoint of obtaining better durability to sweat, sebum, alcohols, and the like, the amount of the crosslinking agent used is selected such that the gel fraction of the adhesive layer in toluene is preferably 40% by mass or more, more preferably 50% by mass or more, and still more preferably 55% by mass or more.

Note that the gel fraction refers to a value measured by the method described below.

The adhesive was applied to a release-treated face of a release liner such that the thickness after drying was 50 µm, dried in an environment of 100° C. for 3 minutes, followed by aging for two days in an environment of 40° C., to form an adhesive layer.

The adhesive layer was cut into a square of 50 mm in length and 40 mm in width to obtain a test piece.

The mass (G1) of the test piece was measured, and then the test piece was immersed in toluene, in an environment of 23° C., for 24 hours.

After the immersion, by filtering a mixture of the test piece and toluene using a 300-mesh metal sieve, insoluble matter in toluene was extracted. The insoluble matter was dried in an environment of 105° C. for one hour, and the mass (G2) of the dried matter was measured.

The gel fraction was calculated on the basis of the mass (G1), the mass (G2), and the following formula.

$$\text{Gel fraction (mass \%)} = (G2/G1) \times 100$$

As the adhesive, an adhesive containing an additive, for example, a plasticizer, a softener, an antioxidant, a flame retardant, a filler such as fibers and balloons made of glass or plastic, beads, a metal, a metal oxide, or a metal nitride, a colorant such as a pigment or a dye, a leveling agent, a thickener, a water repellent, an antifoaming agent, or the like, can be used.

As the adhesive, it is preferable to use an adhesive containing a solvent from the viewpoint of maintaining its good coating workability and the like. Examples of the solvent that can be used include toluene, xylene, ethyl acetate, butyl acetate, acetone, methyl ethyl ketone, hexane, and the like. Furthermore, in the case of a water-based adhesive composition, water or an aqueous solvent containing water as a main component can be used.

As the adhesive composition, an adhesive composition containing, in addition to the components described above, as necessary, other additives can be used.

Examples of the other additives that can be used include anticorrosives, thixotropic agents, dispersants, sensitizers, catalysts for urethanization, polymerization inhibitors, leveling agents, tackifiers, foam stabilizers, and the like. These additives may be used alone or in combination of two or more.

Examples of the adhesive tape according to the present invention include an adhesive sheet tape having the adhesive layer on one side or both sides of a nonwoven fabric backing, a foam backing, a resin film backing, or the like, and an adhesive tape constituted by the adhesive layer only, i.e., a backing-less adhesive tape.

The adhesive tape according to the present invention can be produced, for example, by applying the adhesive to one side or both sides of the backing using a knife coater, a roll coater, a die coater, or the like, followed by drying. The adhesive tape can also be produced by a transfer method in which the adhesive is applied to a surface of a release liner in advance using a knife coater, a roll coater, a die coater, or the like, followed by drying, to form an adhesive layer (A), and then the adhesive layer is bonded to one side or both sides of a backing.

Furthermore, the backing-less adhesive sheet can be produced by applying the adhesive to a surface of a release liner in advance using a knife coater, a roll coater, a die coater, or the like, followed by drying.

As the backing constituting the adhesive sheet, for example, a resin backing, a foam backing, a nonwoven fabric backing, a fabric, paper, or the like can be used. In particular, a resin backing is preferably used as the backing.

As the resin backing, for example, a polyester film or a sheet or film obtained using a polyester, such as polyethylene terephthalate, polyethylene naphthalate, or polybutylene terephthalate, a polyolefin, polyacrylate, polyvinyl chloride, polyethylene, polypropylene ethylene vinyl alcohol, polyurethane, polyamide, polyimide, or the like can be used.

The resin backing may be a backing formed of only the resin film exemplified above, or in order to improve adhesion between the resin backing and the adhesive layer, a primer layer may be disposed on a surface of the resin backing. Furthermore, in order to further improve adhesion with the adhesive layer, the surface of the resin backing may be subjected to a treatment, such as roughening treatment by sandblasting, solvent treatment, or the like, corona discharge treatment, atmospheric pressure plasma treatment, chromic acid treatment, flame treatment, hot air treatment, ozone/ultraviolet irradiation treatment, oxidation treatment, or anchor coat treatment.

The surface of the backing may be subjected to release treatment, antistatic treatment, corona treatment, or the like. The thickness of the backing, which is determined depending on the intended use of the adhesive sheet, is, for example, preferably in a range of 3 μm to 100 μm, more preferably in a range of 5 μm to 50 μm, and still more preferably in a range of 5 μm to 30 μm.

As the method for producing an adhesive tape according to the present invention, for example, in the case of an adhesive tape having a backing (core), a method (direct method) in which the adhesive composition is applied to one side or both sides of the backing, followed by drying or the like, or a method (transfer method) in which the adhesive composition is applied to a surface of a release liner, followed by drying, to form an adhesive layer, and then the adhesive layer is transferred to one side or both sides of the backing may be employed.

Furthermore, as the method for producing the backing-less adhesive tape, for example, a method in which the adhesive composition is applied to a surface of a release liner, followed by drying or the like, to form an adhesive layer may be employed.

As the method of applying the adhesive composition to the backing or release liner, for example, a method using an applicator, a roll coater, a gravure coater, a reverse coater, a spray coater, an air-knife coater, a die coater, or the like may be employed.

As the method of drying the adhesive composition, for example, a method of drying at 50° C. to 140° C. for 30 seconds to 10 minutes may be employed. Furthermore, after the drying, from the viewpoint of accelerating the curing reaction, aging may be further performed in a range of 30° C. to 50° C.

The initial adhesive strength of the adhesive tape obtained by the method described above is preferably in a range of 5 N/5 mm to 20 N/5 mm, more preferably in a range of 6 N/5 mm to 17 N/5 mm, and still more preferably in a range of 7 N/5 mm to 15 N/5 mm. By setting the initial adhesive strength in the range described above, the adhesive tape has good initial adhesive strength, is unlikely to be swollen even when sweat, sebum, an alcohol, or the like adheres thereto, and can maintain excellent adhesive strength for a long time. Note that the initial adhesive strength of the adhesive tape is a value measured by the method described in Examples.

The adhesive tape obtained by the method described above has an adhesive strength (resistance to oleic acid) of 3.5 N/5 mm or more after being left to stand in an environment of 60° C. and 90% RH for 3 days in a state of being immersed in an oleic acid solution having a concentration of 99% by mass. The resistance to oleic acid is preferably 4 N/5 mm or more, more preferably 4.5 N/5 mm or more, and still more preferably 5 N/5 mm or more. By setting the resistance to oleic acid in the range described above, better durability to sweat, sebum, alcohols, and the like can be exhibited. Note that the resistance to oleic acid is a value measured by the method described in Examples.

By employing the adhesive layer described above, the adhesive tape according to the present invention has good initial adhesive strength, does not cause a decrease in adhesive strength even when sweat, sebum, an alcohol, or the like adheres thereto, and can maintain excellent adhesive strength for a long time.

Accordingly, the adhesive composition according to the present invention can be suitably used in various fields, such as double-sided tapes used to attach together cases constituting portable electronic terminals, tablet personal computers, and the like, labels for designing the cases, waterproof tapes, and adhesive tapes for medical use.

EXAMPLES

The present invention will be described in more detail below by way of Examples.

Preparation Example 1

Into a reaction vessel equipped with a stirrer, a reflux condenser, a nitrogen introduction tube, and a thermometer, 59.9 parts by mass of butyl acrylate, 30 parts by mass of methyl acrylate, 10 parts by mass of acrylic acid, 0.1 parts by mass of 4-hydroxybutyl acrylate, 0.08 parts by mass of azobisisobutylnitrile, and 150 parts by mass of ethyl acetate were fed, and under stirring, the temperature was raised to 70 degrees while blowing nitrogen. Under stirring, the content was held at 70° C. for 14 hours, then cooled, and filtered with a 200-mesh metal sieve to obtain an acrylic resin (A1) in which the average number of carbon atoms of the alkyl groups of the (meth)acrylate monomers was 2.7, and the weight average molecular weight was 720,000.

As a crosslinking agent, 0.8 parts by mass of an adduct of tolylene diisocyanate and trimethylolpropane ("BURNOCK D-40" manufactured by DIC Corporation, hereinafter, abbreviated as "D-40") was mixed relative to 100 parts by mass of the acrylic resin (A1) to obtain an adhesive composition (a1).

Preparation Example 2

An adhesive composition (a1') was obtained by the same method as that of Preparation Example 1 except that the crosslinking agent to be mixed was changed to 0.03 parts by mass of an "E-100X" (epoxy-based crosslinking agent, solid content 100% by mass) manufactured by Soken chemical & Engineering Co., Ltd.

Preparation Example 3

An acrylic resin (A2) in which the average number of carbon atoms of the alkyl groups of the (meth)acrylate monomers was 3.1, and the weight average molecular weight was 780,000 was obtained by the same method as that of Preparation Example 1 except that the amount of butyl acrylate was changed to 48.4 parts by mass, the amount of acrylic acid was changed to 8.5 parts by mass, and 13 parts by mass of isobornyl acrylate was further added. As a crosslinking agent, 0.7 parts by mass of D-40 was mixed relative to 100 parts by mass of the acrylic resin (A2) to obtain an adhesive composition (a2).

Preparation Example 4

An acrylic resin (A3) in which the average number of carbon atoms of the alkyl groups of the (meth)acrylate monomers was 3.6, and the weight average molecular weight was 780,000 was obtained by the same method as that of Preparation Example 1 except that the amount of butyl acrylate was changed to 69.9 parts by mass, the amount of methyl acrylate was changed to 0 parts by mass, the amount of acrylic acid was changed to 15 parts by mass, and 15 parts by mass of ethyl acrylate was additionally fed. As a crosslinking agent, 0.5 parts by mass of D-40 was mixed relative to 100 parts by mass of the acrylic resin (A3) to obtain an adhesive composition (a3).

Preparation Example 5

An acrylic resin (A4) in which the average number of carbon atoms of the alkyl groups of the (meth)acrylate monomers was 2.6, and the weight average molecular weight was 870,000 was obtained by the same method as that of Preparation Example 1 except that the amount of ethyl acrylate was changed to 35 parts by mass and the amount of acrylic acid was changed to 5 parts by mass. As a crosslinking agent, 1.0 part by mass of D-40 was mixed relative to 100 parts by mass of the acrylic resin (A4) to obtain an adhesive composition (a4).

Preparation Example 6

An acrylic resin (A5) in which the average number of carbon atoms of the alkyl groups of the (meth)acrylate monomers was 2.7, and the weight average molecular weight was 700,000 was obtained by the same method as that of Preparation Example 1 except that the amount of butyl acrylate was changed to 59.1 parts by mass and the amount of 4-hydroxybutyl acrylate was changed to 0.9 parts by mass. As a crosslinking agent, 0.4 parts by mass of D-40 was mixed relative to 100 parts by mass of the acrylic resin (A5) to obtain an adhesive composition (a5).

Preparation Example 7

An acrylic resin (A6) in which the average number of carbon atoms of the alkyl groups of the (meth)acrylate monomers was 4.0, and the weight average molecular weight was 1,000,000 was obtained by the same method as that of Preparation Example 1 except that the amount of butyl acrylate was changed to 89.9 parts by mass, and the amount of methyl acrylate was changed to 0 parts by mass. As a crosslinking agent, 0.3 parts by mass of D-40 was mixed relative to 100 parts by mass of the acrylic resin (A6) to obtain an adhesive composition (a6).

Preparation Example 8

An acrylic resin (A7) in which the average number of carbon atoms of the alkyl groups of the (meth)acrylate monomers was 3.7, and the weight average molecular weight was 750,000 was obtained by the same method as that of Preparation Example 1 except that butyl acrylate was changed to isobutyl acrylate, the amount of methyl acrylate was changed to 15 parts by mass, and 15 parts by mass of 2-ethylhexyl acrylate was further added. As a crosslinking agent, 0.7 parts by mass of D-40 was mixed relative to 100 parts by mass of the acrylic resin (A7) to obtain an adhesive composition (a7).

Preparation Example 9

An acrylic resin (A8) in which the average number of carbon atoms of the alkyl groups of the (meth)acrylate monomers was 3.8, and the weight average molecular weight was 730,000 was obtained by the same method as that of Preparation Example 8 except that the amount of 2-ethylhexyl acrylate was changed to 0 parts by mass, the amount of methyl acrylate was changed to 0 parts by mass, the amount of acrylic acid was changed to 12 parts by mass, and 10 parts by mass of n-octyl acrylate and 18 parts by mass of ethyl acrylate were further added. As a crosslinking agent, 0.5 parts by mass of D-40 was mixed relative to 100 parts by mass of the acrylic resin (A8) to obtain an adhesive composition (a8).

Comparative Preparation Example 1

An acrylic resin (B1) in which the average number of carbon atoms of the alkyl groups of the (meth)acrylate monomers was 4.4, and the weight average molecular weight was 760,000 was obtained by the same method as that of Preparation Example 1 except that butyl acrylate was changed to 2-ethylhexyl acrylate. As a crosslinking agent, 0.8 parts by mass of D-40 was mixed relative to 100 parts by mass of the acrylic resin (B1) to obtain an adhesive composition (b1).

Comparative Preparation Example 2

An acrylic resin (B2) in which the average number of carbon atoms of the alkyl groups of the (meth)acrylate monomers was 2.6, and the weight average molecular weight was 870,000 was obtained by the same method as that of Preparation Example 1 except that the amount of methyl acrylate was changed to 37.5 parts by mass and the amount of acrylic acid was changed to 2.5 parts by mass. As a crosslinking agent, 1.2 parts by mass of D-40 was mixed relative to 100 parts by mass of the acrylic resin (B2) to obtain an adhesive composition (b2).

Comparative Preparation Example 3

An acrylic resin (B3) in which the average number of carbon atoms of the alkyl groups of the (meth)acrylate monomers was 3.1, and the weight average molecular weight was 1,000,000 was obtained by the same method as that of Preparation Example 5 except that the amount of butyl acrylate was changed to 59.1 parts by mass, the amount of methyl acrylate was changed to 15.9 parts by mass, and the amount of 4-hydroxybutyl acrylate was changed to 20 parts by mass. As a crosslinking agent, 0.05 parts by mass of D-40 was mixed relative to 100 parts by mass of the acrylic resin (B3) to obtain an adhesive composition (b3).

Example 1

The adhesive composition (a1) obtained in Preparation Example 1 was applied to a release-treated face of a release liner (a polyethylene terephthalate film with a thickness of 75 μm, one side of which was release-treated) such that the thickness of an adhesive layer after drying was 50 μm, followed by drying at 80° C. for 5 minutes, to form an adhesive layer with a thickness of 50 μm.

Subsequently, by performing aging, in an environment of 40° C., for 48 hours, a double-sided adhesive tape with a thickness of 50 μm was obtained.

Example 2

A double-sided adhesive tape with a thickness of 50 μm was obtained by the same method as that of Example 1 except that the adhesive composition (a1') was used instead of the adhesive composition (a1).

Example 31

A double-sided adhesive tape with a thickness of 50 μm was obtained by the same method as that of Example 1 except that the adhesive composition (a2) was used instead of the adhesive composition (a1).

Example 4

A double-sided adhesive tape with a thickness of 50 μm was obtained by the same method as that of Example 1 except that the adhesive composition (a3) was used instead of the adhesive composition (a1).

Example 51

A double-sided adhesive tape with a thickness of 50 μm was obtained by the same method as that of Example 1 except that the adhesive composition (a4) was used instead of the adhesive composition (a1).

Example 61

A double-sided adhesive tape with a thickness of 50 μm was obtained by the same method as that of Example 1 except that the adhesive composition (a5) was used instead of the adhesive composition (a1).

Example 71

Two adhesive layers with a thickness of 22 μm were formed by the same method as that of Example 1 in which the adhesive composition was applied such that the thickness of an adhesive layer after drying was 22 μm, followed by drying at 80° C. for 3 minutes. Then, the adhesive layers were bonded to both sides of a 6-μm polyester film to obtain a double-sided adhesive tape with a total thickness of 50 μm.

Example 81

Two adhesive layers with a thickness of 50 μm were formed by the same method as that of Example 1. Then, the adhesive layers were bonded to both sides of a 100-μm polyester film to obtain a double-sided adhesive tape with a total thickness of 200 μm.

Example 91

A double-sided adhesive tape with a thickness of 50 μm was obtained by the same method as that of Example 1 except that the adhesive composition (a6) was used instead of the adhesive composition (a1).

Example 101

A double-sided adhesive tape with a thickness of 50 μm was obtained by the same method as that of Example 1 except that the adhesive composition (a7) was used instead of the adhesive composition (a1).

Example 11

A double-sided adhesive tape with a thickness of 50 μm was obtained by the same method as that of Example 1 except that the adhesive composition (a8) was used instead of the adhesive composition (a1).

Comparative Example 1

A double-sided adhesive tape with a thickness of 50 μm was obtained by the same method as that of Example 1 except that the adhesive composition (b1) was used instead of the adhesive composition (a1).

Comparative Example 2

A double-sided adhesive tape with a thickness of 50 μm was obtained by the same method as that of Example 1 except that the adhesive composition (b2) was used instead of the adhesive composition (a1).

Comparative Example 3

A double-sided adhesive tape with a thickness of 50 μm was obtained by the same method as that of Example 1 except that the adhesive composition (b3) was used instead of the adhesive composition (a1).

[Method of Measuring Initial Adhesive Strength]

The release liner on one side of each of the double-sided adhesive tapes obtained in Examples and Comparative Examples was peeled off, and the adhesive tape was backed with a SUS foil having a thickness of 50 μm and cut into a width of 5 mm to obtain a test piece.

The release liner on the other side of the test piece was peeled off, and the test piece was attached to a surface of a stainless steel (SUS) sheet (bonding area 5 mm×80 mm). Then, pressure bonding was performed by reciprocating a 2 kg roll twice on the upper surface thereof to obtain an attached object.

The attached object was left to stand in an environment of 23° C. and 50% RH for 24 hours, and then, left to stand in an environment of 60° C. and 90% RH for 3 days. Subsequently, the attached object was left to stand at 23° C. and 50% RH for 24 hours.

Next, the 180 degree peel strength (N/5 mm) of the test piece constituting the attached object was measured in an environment of 23° C. and 50% RH in accordance with JIS Z0237.

[Evaluation Method for Resistance to Oleic Acid]

The attached object obtained in the [Method of measuring adhesive strength] was left to stand in an environment of 23° C. and 50% RH for 24 hours, and then, in a state of being immersed in an oleic acid solution having a concentration of 99% by mass, left to stand in an environment of 60° C. and 90% RH for 3 days.

Subsequently, the attached object was taken out from the solution and washed, and then, left to stand at 23° C. and 50% RH for one hour.

Next, the 180 degree peel strength (N/5 mm) of the test piece constituting the attached object was measured in an environment of 23° C. and 50% RH in accordance with JIS Z0237.

[Evaluation Method for Water Resistance]

The attached object obtained in the [Method of measuring adhesive strength] was left to stand in an environment of 23° C. and 50% RH for 24 hours, and then, in a state of being immersed in distilled water, left to stand in an environment of 60° C. and 90% RH for 3 days.

Subsequently, the attached object was taken out from the solution, and then, left to stand at 23° C. and 50% RH for one hour.

Next, the 180 degree peel strength (N/5 mm) of the test piece constituting the attached object was measured in an environment of 23° C. and 50% RH in accordance with JIS Z0237.

TABLE 1

|  | Example 1 | Example 2 | Example 3 | Example 4 | Example 5 | Example 6 |
|---|---|---|---|---|---|---|
| Adhesive composition | a1 | a1' | a2 | a3 | a4 | a5 |
| (A) | 10 | 10 | 8.5 | 15 | 5 | 10 |
| (B) | 0.1 | 0.1 | 0.1 | 0.1 | 0.1 | 0.9 |
| Average number of carbon atoms of saturated hydrocarbon groups included in (C) | 2.7 | 2.7 | 3.1 | 3.6 | 2.6 | 2.7 |
| Molecular weight [Mw] | 72 | 72 | 78 | 78 | 87 | 70 |
| Thickness of adhesive layer [μm] | 50 | 50 | 50 | 50 | 50 | 50 |
| Thickness of tape [μm] | 50 | 50 | 50 | 50 | 50 | 50 |
| Initial adhesive strength [N/5 mm] | 10.1 | 9.4 | 11.1 | 11.0 | 8.9 | 7.6 |
| Resistance to oleic acid [N/5 mm] | 8.8 | 7.7 | 6.3 | 6.6 | 4.5 | 5.2 |
| Water resistance [N/5 mm] | 9.9 | 9.2 | 10.7 | 10.7 | 8.8 | 7.1 |

TABLE 2

|  | Example 7 | Example 8 | Example 9 | Example 10 | Example 11 |
|---|---|---|---|---|---|
| Adhesive composition | a1 | a1 | a6 | a7 | a8 |
| (A) | 10 | 10 | 10 | 10 | 12 |
| (B) | 0.1 | 0.1 | 0.1 | 0.1 | 8.1 |
| Average number of carbon atoms of saturated hydrocarbon groups included in (C) | 2.7 | 2.7 | 4.0 | 3.7 | 3.3 |
| Molecular weight [Mw] | 72 | 72 | 100 | 75 | 73 |
| Thickness of adhesive layer [μm] | 22 | 100 | 50 | 50 | 50 |
| Thickness of tape [μm] | 50 | 200 | 50 | 50 | 50 |
| Initial adhesive strength [N/5 mm] | 10.2 | 9.5 | 9.1 | 10.5 | 10.3 |
| Resistance to oleic acid [N/5 mm] | 6.1 | 8.5 | 3.5 | 4.1 | 4.2 |
| Water resistance [N/5 mm] | 10.0 | 9.3 | 8.1 | 9.7 | 9.5 |

TABLE 3

|  | Comparative Example 1 | Comparative Example 2 | Comparative Example 3 |
|---|---|---|---|
| Adhesive composition | b1 | b2 | b3 |
| (A) | 10 | 2.5 | 5 |
| (B) | 0.06 | 0.06 | 20 |
| Average number of carbon atoms of saturated hydrocarbon groups included in (C) | 4.4 | 2.6 | 3.1 |
| Molecular weight [Mw] | 76 | 87 | 100 |
| Thickness of adhesive layer [μm] | 50 | 50 | 50 |
| Thickness of tape [μm] | 50 | 50 | 50 |
| Initial adhesive strength [N/5 mm] | 11.3 | 8.3 | 7.5 |
| Resistance to oleic acid [N/5 mm] | 3.1 | 2.5 | 3.5 |
| Water resistance [N/5 mm] | 11.0 | 8.2 | 2.3 |

*(A): Carboxyl group-containing monomer
(B): Hydroxyl group-containing monomer
(C): Alkyl (meth)acrylate monomer and alicyclic monomer other than (A) and (B)

The invention claimed is:

1. An adhesive tape having an adhesive layer comprising an acrylic adhesive, the acrylic adhesive including an acrylic copolymer,
wherein the acrylic copolymer contains, as constituent components,
(A) 5 to 20% by mass of a carboxyl group-containing monomer,
(B) 0.1 to 1% by mass of a hydroxyl group-containing monomer, and
(C) 70 to 94.9% by mass of one or two or more selected from the group consisting of other alkyl (meth)acrylate monomers and alicyclic monomers,
wherein the average number of carbon atoms of saturated hydrocarbon groups included in the monomers (C) is 1 to 3.8,
wherein the acrylic adhesive does not include a tackifying resin,
wherein a molecular weight of the acrylic copolymer is 400,000 to 1,100,000,
wherein the adhesive strength is 4.1 to 8.8 N/5 mm, wherein the adhesive strength is measured by the steps comprising:
providing a double-sided adhesive tape comprising the adhesive tape having a first surface and a second surface, the first surface provided with a first release liner, the second surface provided with a second release liner,
peeling off the first release liner;
adhering a SUS foil having a thickness of 50 μm to the first surface, followed by cutting the double-sided adhesive tape to have a width of 5 mm to obtain a test piece;
peeling off the second release liner;
adhering a surface of a stainless steel (SUS) sheet having a bonding area 5 mm×80 mm to the second surface;
subjecting a pressure bonding performed by reciprocating a 2 kg roll twice on an upper surface of the test piece to obtain an attached object;
leaving the attached object to stand in an environment of 23° C. and 50% RH for 24 hours, followed by leaving the attached object to stand in an environment of 60° C. and 90% RH for 3 days in a state of being immersed in an oleic acid solution having a concentration of 99% by mass; and
measuring a 180 degree peel strength (N/5 mm) of the test piece constituting the attached object in an environment of 23° C. and 50% RH in accordance with JIS Z0237.

2. The adhesive tape according to claim 1, wherein the adhesive layer has a thickness of 5 to 200 μm.

3. The adhesive tape according to claim 1, wherein a value of initial adhesive strength is in a range of 5 N/5 mm to 20 N/5 mm, wherein the value of initial adhesive strength is measured by the steps comprising:
providing a double-sided adhesive tape comprising the adhesive tape having a first surface and a second surface, the first surface provided with a first release liner, the second surface provided with a second release liner,
peeling off the first release liner;
adhering a SUS foil having a thickness of 50 μm to the first surface, followed by cutting the double-sided adhesive tape to have a width of 5 mm to obtain a test piece;
peeling off the second release liner;
adhering a surface of a stainless steel (SUS) sheet having a bonding area 5 mm×80 mm to the second surface;
subjecting a pressure bonding performed by reciprocating a 2 kg roll twice on an upper surface of the test piece to obtain an attached object;
leaving the attached object to stand in an environment of 23° C. and 50% RH for 24 hours, followed by leaving the attached object to stand in an environment of 60° C. and 90% RH for 3 days, followed by leaving the attached object to stand at 23° C. and 50% RH for 24 hours; and
measuring a 180 degree peel strength (N/5 mm) of the test piece constituting the attached object in an environment of 23° C. and 50% RH in accordance with JIS Z0237.

4. The adhesive tape according to claim 1, wherein the average number of carbon atoms of saturated hydrocarbon groups included in the monomers (C) is 2.6 to 3.8.

5. The adhesive tape according to claim 1, wherein the molecular weight of the acrylic copolymer is 400,000 to 780,000.

* * * * *